(12) United States Patent
Onishi et al.

(10) Patent No.: US 10,803,846 B2
(45) Date of Patent: Oct. 13, 2020

(54) SOUNDPROOFING MATERIAL

(71) Applicant: NISHIKAWA RUBBER CO., LTD., Hiroshima (JP)

(72) Inventors: Nobukazu Onishi, Hiroshima (JP); Takashi Yamashita, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 358 days.

(21) Appl. No.: 15/881,734

(22) Filed: Jan. 27, 2018

(65) Prior Publication Data

US 2018/0218722 A1 Aug. 2, 2018

(30) Foreign Application Priority Data

Feb. 1, 2017 (JP) ................. 2017-016640

(51) Int. Cl.
| | |
|---|---|
| *G10K 11/168* | (2006.01) |
| *B60R 13/08* | (2006.01) |
| *B32B 5/18* | (2006.01) |
| *B32B 27/06* | (2006.01) |
| *B32B 27/32* | (2006.01) |
| *G10K 11/16* | (2006.01) |

(52) U.S. Cl.
CPC ............. *G10K 11/168* (2013.01); *B32B 5/18* (2013.01); *B32B 27/065* (2013.01); *B32B 27/32* (2013.01); *B60R 13/0815* (2013.01); *B32B 2307/102* (2013.01); *B32B 2605/08* (2013.01); *B60Y 2306/09* (2013.01)

(58) Field of Classification Search
CPC ...... G10K 11/168; G10K 11/16; B60R 13/08; B60R 13/0815; B60R 13/083; B32B 7/02; B32B 5/18
See application file for complete search history.

(56) References Cited

U.S. PATENT DOCUMENTS

| | | | | |
|---|---|---|---|---|
| 2,116,771 A | * | 5/1938 | Seaman | B60R 13/083 428/153 |
| 3,868,796 A | * | 3/1975 | Bush | B60J 5/045 52/783.12 |
| 4,399,174 A | * | 8/1983 | Tanaka | B60J 5/043 296/146.6 |
| 4,504,346 A | * | 3/1985 | Newsam | B29D 24/005 156/242 |
| 4,966,799 A | * | 10/1990 | Lucca | B60N 3/048 428/95 |
| RE36,323 E | * | 10/1999 | Thompson | B32B 5/02 181/286 |

(Continued)

FOREIGN PATENT DOCUMENTS

| | | |
|---|---|---|
| JP | 3048125 U | 2/1998 |
| JP | 2008537526 A | 9/2008 |

(Continued)

*Primary Examiner* — Edgardo San Martin

(74) *Attorney, Agent, or Firm* — Renner, Otto, Boisselle & Sklar, LLP

(57) ABSTRACT

A soundproofing material 1 includes: a first sheet-like acoustic material 10; a second sheet-like acoustic material 20 stacked on the first acoustic material 10 in a thickness direction; and a coating member 30 covering the second acoustic material 20 from a side opposite to the first acoustic material 10, and adhered to the first acoustic material 10.

4 Claims, 11 Drawing Sheets

(56) References Cited

U.S. PATENT DOCUMENTS

| | | | | |
|---|---|---|---|---|
| 6,251,498 B1 * | 6/2001 | Fukushima | ......... | B60R 13/0876 |
| | | | | 428/164 |
| 6,482,496 B1 * | 11/2002 | Wycech | ................ | B29C 44/12 |
| | | | | 296/146.6 |
| 6,722,720 B2 * | 4/2004 | Donick | ................ | B62D 25/08 |
| | | | | 296/39.3 |
| 6,726,980 B2 * | 4/2004 | Staelgraeve | ........... | B60J 5/0418 |
| | | | | 428/156 |
| 7,070,848 B2 * | 7/2006 | Campbell | ............. | B60R 13/083 |
| | | | | 181/284 |
| 7,211,321 B2 * | 5/2007 | Wycech | ............... | B62D 29/002 |
| | | | | 428/316.6 |
| 7,428,774 B2 * | 9/2008 | Thomas | ............... | B62D 29/002 |
| | | | | 29/525.13 |
| 7,677,358 B2 * | 3/2010 | Tocchi | ................ | B60R 13/0861 |
| | | | | 181/290 |
| 8,371,634 B2 * | 2/2013 | Hernandez Covarrubias | .............. | |
| | | | | B60R 13/0861 |
| | | | | 296/193.06 |
| 10,259,402 B2 * | 4/2019 | Onishi | ....................... | B32B 3/28 |
| 10,286,826 B2 * | 5/2019 | Davies | .................... | B32B 27/32 |
| 10,479,176 B2 * | 11/2019 | Yamashita | ............... | B60J 10/50 |
| 2003/0220034 A1 * | 11/2003 | Ochs | .................... | B62D 25/161 |
| | | | | 442/76 |
| 2009/0085378 A1 * | 4/2009 | Borchardt | ........... | B60R 13/0815 |
| | | | | 296/191 |
| 2011/0108359 A1 | 5/2011 | Nishimura et al. | | |
| 2020/0013384 A1 * | 1/2020 | Hasegawa | ............... | B29C 39/02 |

FOREIGN PATENT DOCUMENTS

| | | | | |
|---|---|---|---|---|
| JP | 2018131013 A | * | 8/2018 | |
| JP | 2019085045 A | * | 6/2019 | |
| WO | 2006/105933 | | 10/2006 | |
| WO | 2010/007834 | | 1/2010 | |

* cited by examiner

SOUNDPROOFING MATERIAL

CROSS-REFERENCE TO RELATED APPLICATION

This application claims priority to Japanese Patent Application No. 2017-016640 filed on Feb. 1, 2017, the entire disclosure of which is hereby incorporated by reference.

BACKGROUND

The present disclosure relates to a soundproofing material provided, for example, in a vehicle, and particularly belongs to a technical field of stacking sheet-like acoustic materials.

In-fender soundproofing materials provided, for example, inside front fenders of a vehicle have been known (see, for example, Japanese Utility Model Registration No. 3048125). The in-fender soundproofing material according to Japanese Utility Model Registration No. 3048125 is molded in a form blocking the space inside front fenders. The in-fender soundproofing material is made of, for example, a polyurethane foam material, a bulky nonwoven fabric, or a polyurethane film.

SUMMARY

Provision of the soundproofing material in components of a vehicle, for example, according to Japanese Utility Model Registration No. 3048125 is considered to keep silence inside a cabin. However, increasing silence has been demanded in recent years. In particular, reduction in road noise entering a cabin during driving has been increasingly demanded. An improvement in soundproofing performance is required not only in vehicles, but also in various places.

To meet the demand, stacking sheet-like acoustic materials to improve acoustic effects and eventually improve soundproofing performance is considered. In a multilayer structure, the acoustic materials forming respective layers need to be integrated while reducing relative displacement of the acoustic materials in view of workability in attachment and facility in transportation.

A typical method of reducing relative displacement of acoustic materials is adhesion of the acoustic materials. In adhesion of acoustic materials, an adhesive layer is formed between adjacent ones of the acoustic materials. The adhesive layer is generally a solid layer without air bubbles. High acoustic characteristics are thus hardly expected. The adhesive layer serves as an insulator between the adjacent acoustic materials, and hinders formation of a thick acoustic layer.

The present disclosure was made in view of the problems. It is an object of the disclosure to reduce relative displacement of sheet-like acoustic materials without providing any wide adhesive layer, when stacking the acoustic materials to improve acoustic characteristics, and eventually improve the performance of a soundproofing material.

In order to achieve the objective, a coating member adhered to a first acoustic material integrates a second acoustic material with the first acoustic material in the present disclosure.

A first aspect of the present disclosure provides a soundproofing material including integrally formed acoustic materials. The soundproofing material includes: a first sheet-like acoustic material; a second sheet-like acoustic material stacked on the first acoustic material in a thickness direction; and a coating member covering the second acoustic material from a side opposite to the first acoustic material, and adhered to the first acoustic material. The coating member integrates the second acoustic material with the first acoustic material.

In this configuration, the first and second acoustic materials are stacked one on the other in the thickness direction to form the soundproofing material with a multilayer structure. The coating member adhered to the first acoustic material integrates the second acoustic material with the first acoustic material. This configuration reduces displacement between the first and second acoustic materials without providing any wide adhesive layer between the first and second acoustic materials. This configuration requires no or only a narrow adhesive layer, from which only low acoustic characteristics can be expected. The first and second acoustic materials form a thick acoustic layer, thereby improving acoustic characteristics.

Since the first and second acoustic materials are formed integrally, the workability in assembling and transportation is both high.

According to a second aspect of the present disclosure, in the first aspect, the first acoustic material is an elastic material with a larger outer size than the second acoustic material, and expands beyond a peripheral edge of the second acoustic material, with the second acoustic material stacked on the first acoustic material.

This configuration allows the peripheral edge of the first acoustic material to come into contact with another member so as to be deformed elastically in mounting the soundproofing material. This reduces formation of a gap between the soundproofing material and the other member, and displacement of the soundproofing material.

According to a third aspect of the present disclosure, in the second aspect, the coating member includes a recess housing the second acoustic material, and a fixing plate region formed in a peripheral edge of the recess, and adhered to a peripheral edge of the first acoustic material.

This configuration adheres the fixing plate region of the coating member to the peripheral edge of the first acoustic material, with the second acoustic material housed in the recess of the coating member, thereby integrating the first acoustic material with the second acoustic material.

According to a fourth aspect of the present disclosure, in the third aspect, a part of the peripheral edge of the second acoustic material projects outside the coating member.

In this configuration, the part of the peripheral edge of the second acoustic material projects outside the coating member. This configuration allows the part of the peripheral edge of the second acoustic material to come into contact with another member so as to be deformed elastically in mounting the soundproofing material. This reduces formation of a gap between the soundproofing material and the other member.

According to a fifth aspect of the present disclosure, in the first aspect, the coating member is a water impermeable member.

In this configuration, if the soundproofing material is, for example, exposed to water, the coating member is disposed to face the water so that the second acoustic material is less subjected to the water. This reduces degradation in the acoustic characteristics of the second acoustic material.

According to the first aspect of the present disclosure, the coating member adhered to the first acoustic material integrates the second acoustic material with the first acoustic material, while covering the second acoustic material. This configuration reduces relative displacement between the first and second acoustic materials without providing any wide adhesive layer. This configuration forms a thick acoustic layer, thereby improving acoustic characteristics. As a result, the soundproofing material has improved performance.

According to the second aspect, the first acoustic material expands beyond the peripheral edge of the second acoustic material, with the second acoustic material stacked on the first acoustic material. This configuration allows the peripheral edge of the first acoustic material to come into contact with another member so as to be deformed elastically in mounting the soundproofing material. This reduces formation of a gap between the soundproofing material and the other member, and displacement of the soundproofing material, thereby further improving soundproofing characteristics.

According to the third aspect, the fixing plate region of the coating member is adhered to the peripheral edge of the first acoustic material, with the second acoustic material housed in the recess of the coating member, to integrate the first acoustic material with the second acoustic material.

According to the fourth aspect, the part of the peripheral edge of the second acoustic material projects outside the coating member. This configuration allows the part of the second acoustic material to come into contact with another member so as to be deformed elastically. This reduces formation of a gap between the soundproofing material and the other member, thereby further improving soundproofing characteristics.

According to the fifth aspect, the coating member is a water impermeable member. This configuration reduces degradation in the acoustic characteristics of the second acoustic material.

DETAILED DESCRIPTION

Embodiments of the present disclosure will now be described in detail with reference to the drawings. The following description of advantageous embodiments is only an example in nature, and is not intended to limit the scope, application, or uses of the present disclosure.

First Embodiment

Figure 1:
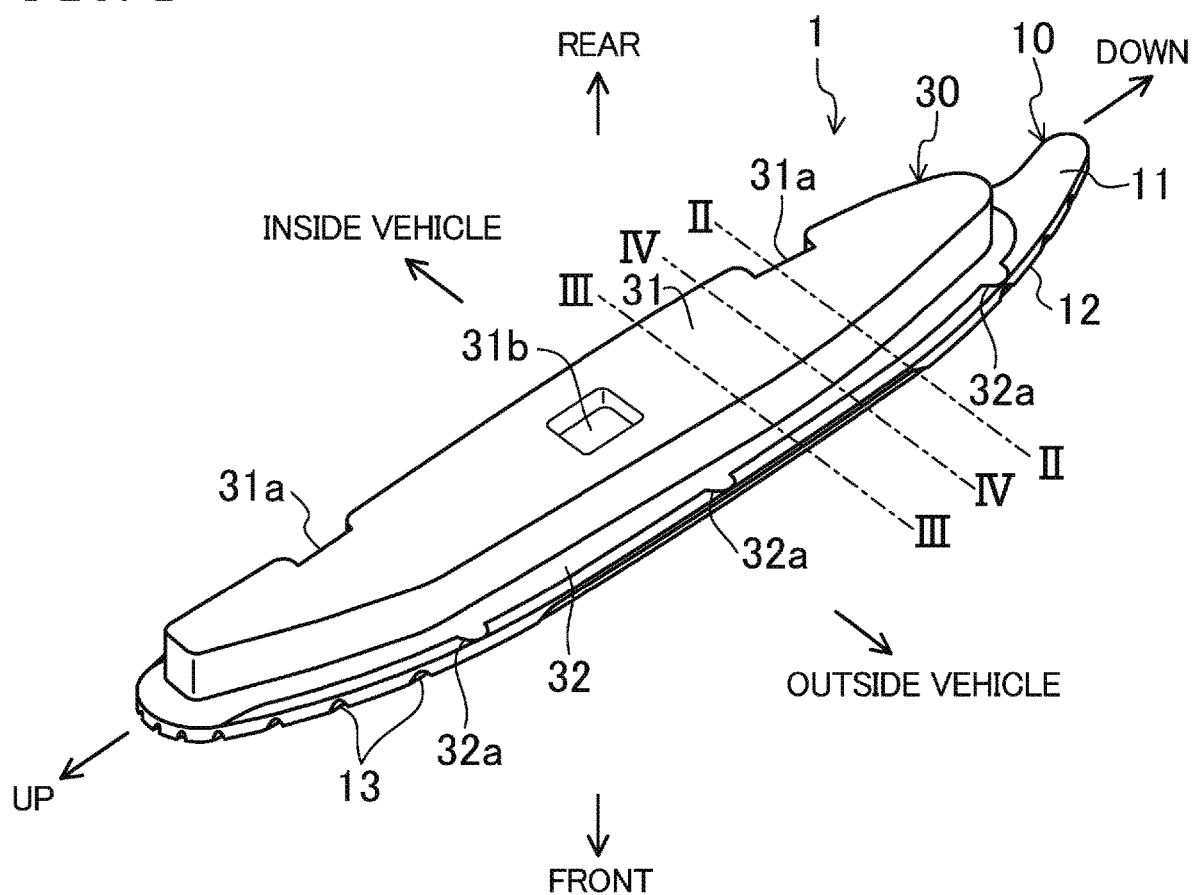
FIG. 1 is a perspective view of a soundproofing material according to a first embodiment.
Figure 2:
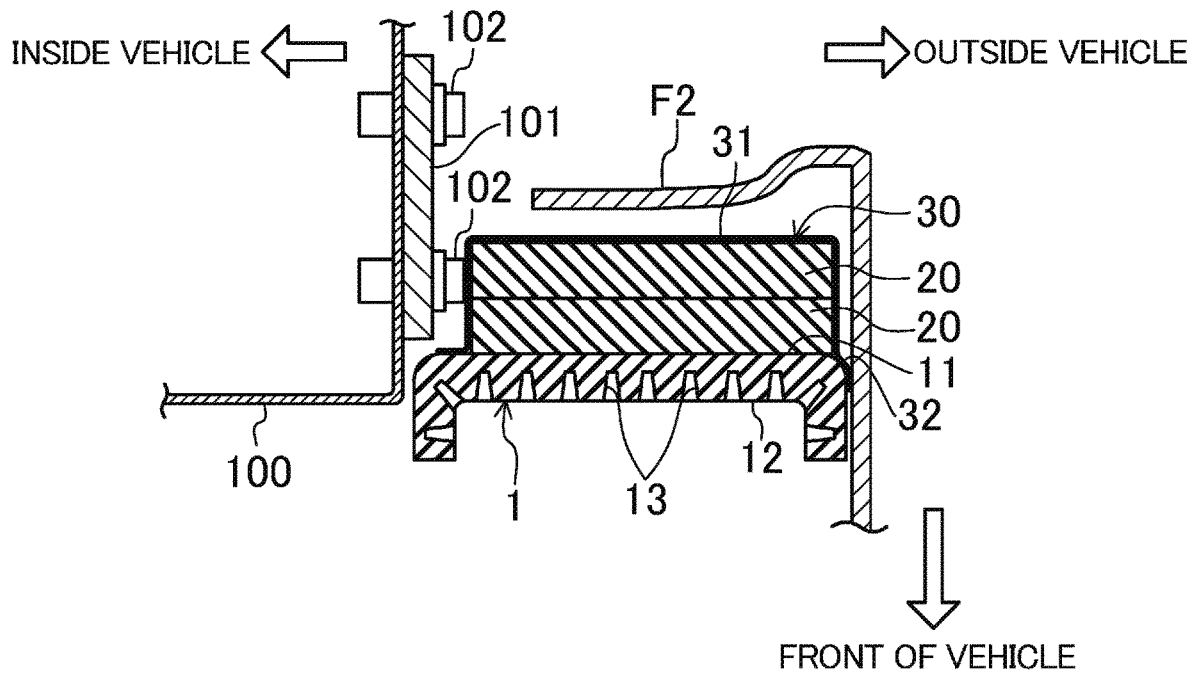
FIG. 2 is a cross-sectional view of the soundproofing material mounted in a vehicle body taken along the line II-II of FIG. 1.

FIG. 1 illustrates a soundproofing material 1 according to a first embodiment of the present disclosure. The soundproofing material 1 is formed by integrating acoustic materials 10 and 20. As shown in FIG. 2, the soundproofing material 1 is a member provided inside a front fender F of a vehicle to reduce noise outside the vehicle entering the inside of the vehicle. The front fender F of the vehicle includes an outer plate part F1 and an inner plate part F2. The outer plate part F1 forms an outer plate of the vehicle. The inner plate part F2 extends from the edge of the outer plate part F1 toward the inside of the vehicle. The outer plate part F1 curves gently so that its vertically intermediate portion is located most outward in the vehicle. A vertically extending pillar 100 is provided more inward than the front fender F in a vehicle body. Two door hinges 101 (only one is shown in FIG. 2) for attaching a front door (not shown) are provided more outward than the pillar 100 in the vehicle, and vertically spaced apart from each other. Each of the door hinges 101 is fixed to the pillar 100 by fastening members 102 and 102.

Configuration of Soundproofing Material

The soundproofing material 1 includes a first sheet-like acoustic material 10, second sheet-like acoustic materials 20 and 20, and a coating member 30. The second acoustic materials 20 and 20 are stacked on the first acoustic material 10 in a thickness direction. The soundproofing material 1 has a vertically long shape corresponding to the internal shape of the front fender F. The outer side of the soundproofing material 1 in the vehicle curves along the curve of the outer plate part F1 of the front fender F so that its vertically intermediate portion is located outermost in the vehicle. The inner side of the soundproofing material 1 in the vehicle does not curve like the outer side but extends vertically like a straight line. The shape of the soundproofing material 1 is not limited to what is shown in the drawings, and may be modified in accordance with the type of the vehicle and the shape of the front fender F. The shape of the soundproofing material 1 may be determined arbitrarily in accordance with the location of the soundproofing material 1.

In the description of this embodiment, the side closer to the front of the vehicle is simply referred to as "front," and the side closer to the rear of the vehicle is simply referred to as "rear."

Figure 5:
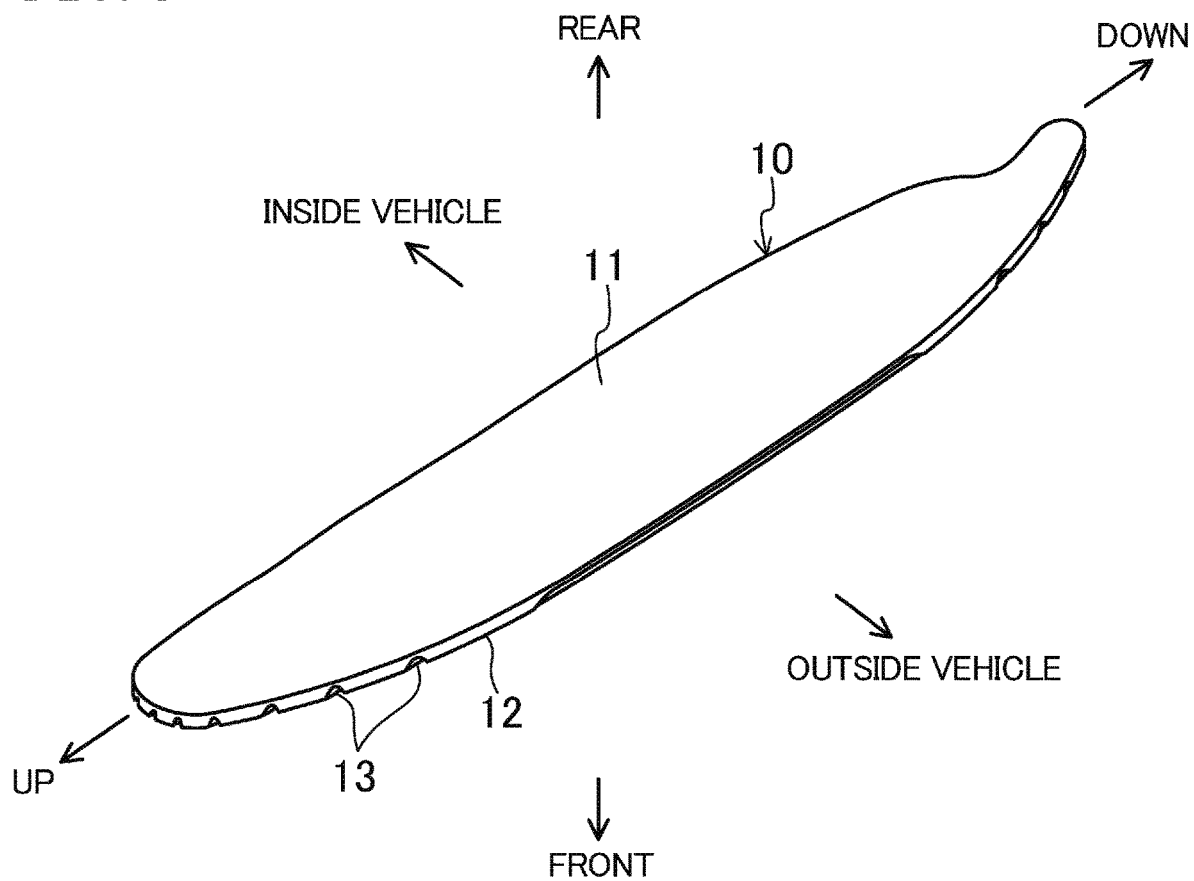
FIG. 5 is a perspective view of a first acoustic material.

The first acoustic material 10 shown in FIG. 5 is made of, for example, an elastic material such as foamed rubber, but otherwise may be made of a foamed resin or a fiber material such as nonwoven fabric. In this embodiment, the first acoustic material 10 is a sponge material made of ethylene-propylene-diene rubber (EPDM). In the description of this embodiment, the surface of the first acoustic material 10 on the rear side when the first acoustic material 10 is mounted is referred to as a rear surface 11. The surface of the first acoustic material 10 on the front side when the first acoustic material 10 is mounted is referred to as a front surface 12. This definition is used only for convenience of explanation, and not intended to limit how to mount the first acoustic material 10.

The rear surface 11 of the first acoustic material 10 is substantially flat, and is formed as a thin skin layer. Vertically extending grooves 13 are formed in the front surface 12 of the first acoustic material 10 and spaced apart from each other in the vehicle inside and outside direction. The formation of the grooves 13 makes the front surface 12 of the first acoustic material 10 uneven, thereby improving noise absorbing performance. Note that the grooves 13 may be omitted. The grooves 13 may extend in the vehicle inside and outside direction.

Figure 6:
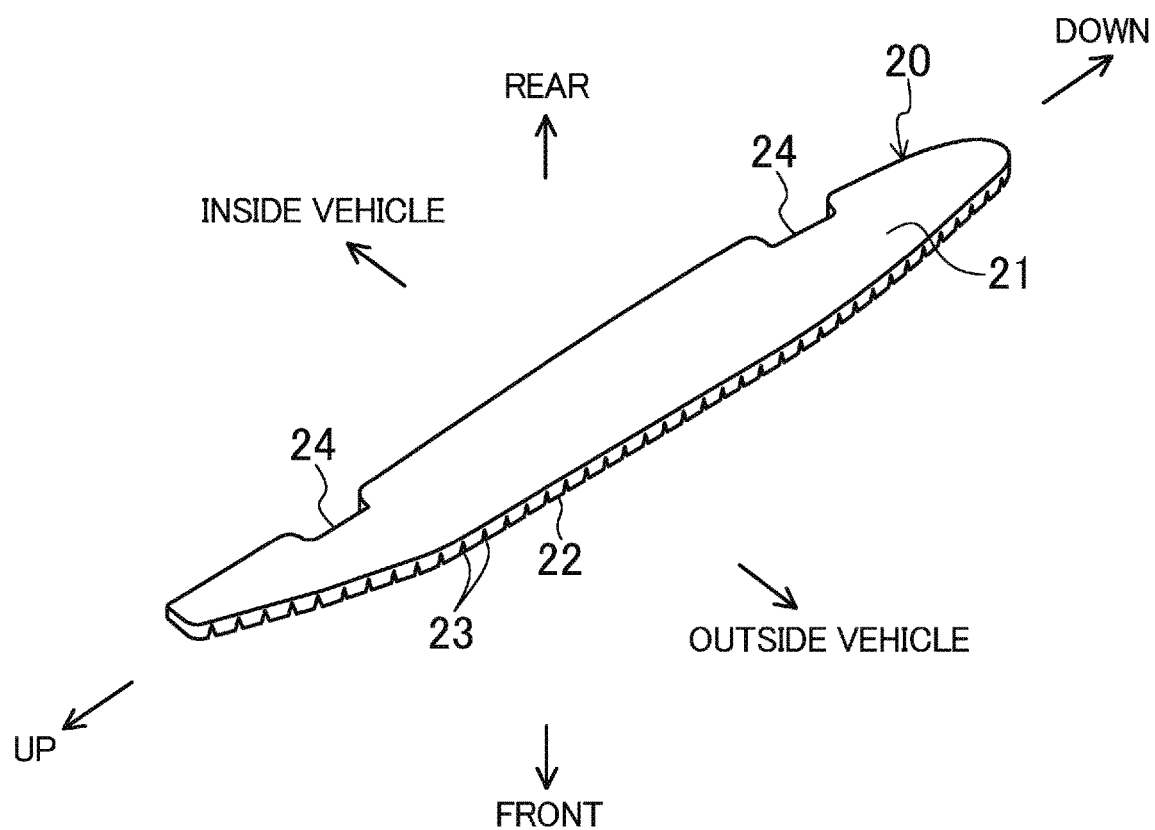
FIG. 6 is a perspective view of a second acoustic material.

The second acoustic material 20 shown in FIG. 6 is made of a material similar to that of the first acoustic material 10. In the description of this embodiment, the surface of the second acoustic material 20 on the rear side when the second acoustic material 20 is mounted is referred to as a rear surface 21. The surface of the second acoustic material 20 on the front side when the second acoustic material 20 is mounted is referred to as a front surface 22. This definition is used only for convenience of explanation, and not intended to limit how to mount the second acoustic material 20.

The rear surface 21 of the second acoustic material 20 is substantially flat, and is formed as a thin skin layer. Grooves 23 extending in the vehicle inside and outside direction are formed in the front surface 22 of the second acoustic material 20 and vertically spaced apart from each other in the vehicle inside and outside direction. The formation of the grooves 23 makes the front surface 22 of the second acoustic material 20 uneven, thereby improving noise absorbing performance. Note that the grooves 23 may be omitted. The grooves 23 may extend vertically.

The soundproofing material 1 includes two second acoustic materials 20 and 20. The two second acoustic materials 20 and 20 have the same outer size and thickness. The one of the second acoustic materials 20, which is directly stacked on the first acoustic material 10 (i.e., the second acoustic material on the front side) is located so that the side having the grooves 23 comes into contact with the flat surface (i.e., the rear surface 11) of the first acoustic material 10. On the other hand, the second acoustic material 20 on the rear side is located so that the side having the grooves 23 comes into contact with the flat surface (i.e., the rear surface 21) of the second acoustic material 20 on the front side. While the two second acoustic materials 20 are stacked one on the other in this embodiment, the number of the second acoustic materials 20 is not limited thereto. Only one second acoustic material 20 may be used or three or more second acoustic materials 20 may be stacked one on another. The two second acoustic materials 20 and 20 may have different thicknesses and/or different outer sizes.

The first acoustic material 10 has a larger outer size than the second acoustic materials 20. The second acoustic materials 20 are staked on a central portion of the first acoustic material 10. Thus, with the second acoustic materials 20 staked on the first acoustic material 10, the entire peripheral edge of the first acoustic material 10 expands outward beyond the peripheral edges of the second acoustic materials 20. That is, the first acoustic material 10 expands beyond the peripheral edges of the second acoustic materials 20, with the second acoustic materials 20 stacked on the first acoustic material 10.

Two cutouts 24 and 24 are formed in the inner edge of each second acoustic material 20 in the vehicle and vertically spaced apart from each other. The cutouts 24 and 24 are formed corresponding to positions of the door hinges 101 and avoiding the door hinges 101. The cutouts 24 may be omitted.

Figure 7:
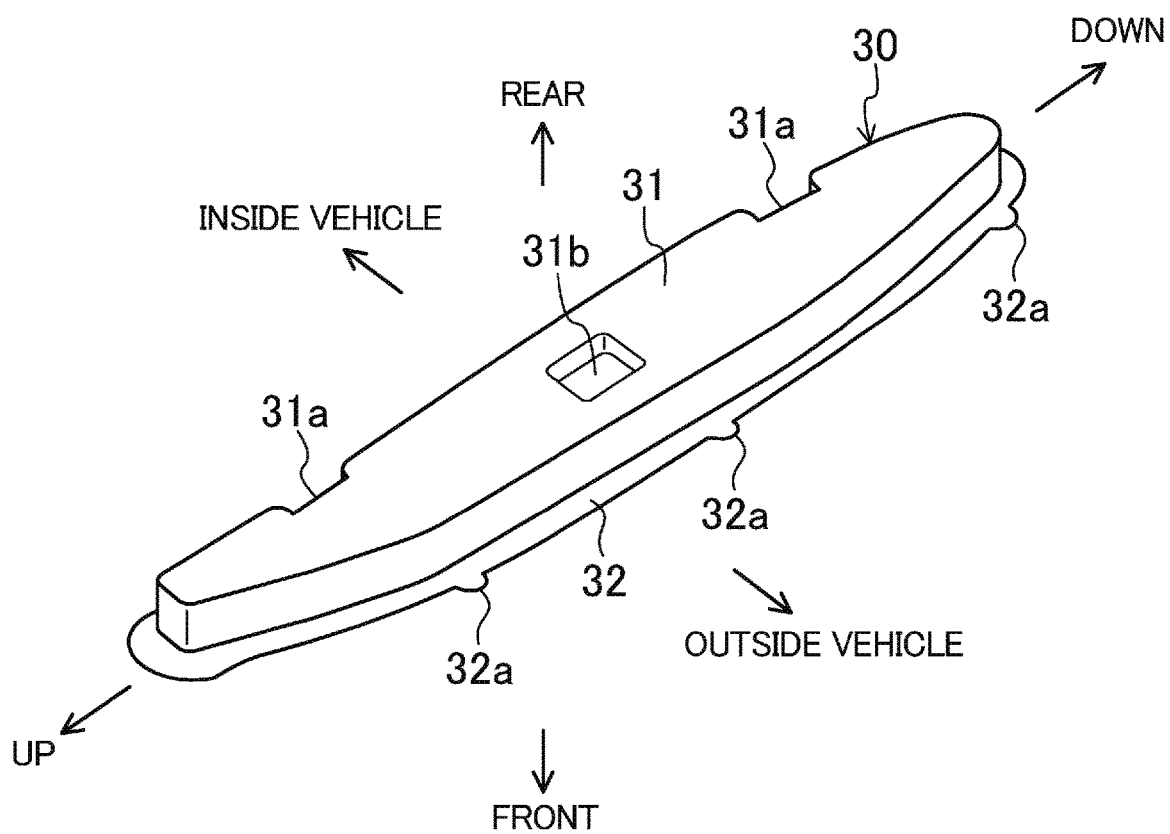
FIG. 7 is a perspective view of a coating member.

The coating member 30 is a water impermeable and sound insulating member, which is made of, for example, a resin sheet material such as polyethylene. The material of the coating member 30 is not limited thereto and may be one of various types of materials. As shown in, for example, FIG. 7, the coating member 30 includes a recess 31 housing the second acoustic materials 20 and 20, and a fixing plate region 32.

The entire recess 31 is exposed toward the front. Through this exposed region, the second acoustic materials 20 and 20 enter the recess 31. Recesses 31*a* and 31*a* are formed in the outer surface of the recess 31 in positions corresponding to the cutouts 24 and 24 of the second acoustic materials 20. The formation of the recesses 31*a* and 31*a* avoids or reduces strong interference with the door hinges 101. In addition, a dent 31*b* is formed in the outer surface of the recess 31 to press the second acoustic materials 20 inside the recess 31. FIG. 2 also shows that the cutouts 24 and 24 of the second acoustic materials 20 and the recesses 31*a* and 31*a* of the coating member 30 avoid or reduce strong interference with the door hinges 101. Note that FIG. 2 illustrates the soundproofing material 1 taken along the line II-II of FIG. 1. The recesses 31*a* and/or the dent 31*b* may be omitted.

The fixing plate region 32 extends along the entire peripheral edge of the recess 31 on the exposed side. The front surface of the fixing plate region 32 is adhered to the peripheral edge of the rear surface 11 of the first acoustic material 10 (the region outward than the second acoustic materials 20). The fixing plate region 32 may be adhered to the first acoustic material 10 by heat welding or, for example, an adhesive agent or a double-sided tape.

Positioning extensions 32*a*, 32*a*, . . . , are formed in the fixing plate region 32 and circumferentially spaced apart from each other. The positioning extensions 32*a* come in contact with a manufacturing apparatus (not shown) in manufacturing the soundproofing material 1 to locate the coating member 30 in a predetermined position.

Having the recess 31, the coating member 30 is less deformed, even if the coating member 30 is vertically long. In addition, the fixing plate region 32 is formed like a flange to reinforce the coating member 30. As a result, the coating member 30 has greater stiffness. This configuration reduces deformation of the coating member 30, even if the coating member 30 has a reduced thickness to have a reduced weight. The adhesion of the less deformable coating member 30 to the first acoustic material 10 also reduces undesired deformation of the first acoustic material 10.

Method of Manufacturing Soundproofing Material

A method of manufacturing the soundproofing material 1 configured as described above will be explained. First, sheet-like foamed rubber is cut into the first acoustic material 10 and the second acoustic materials 20. Sheet-like polyethylene is heat-molded to form the recess 31 and the fixing plate region 32 integrally.

Figure 8:
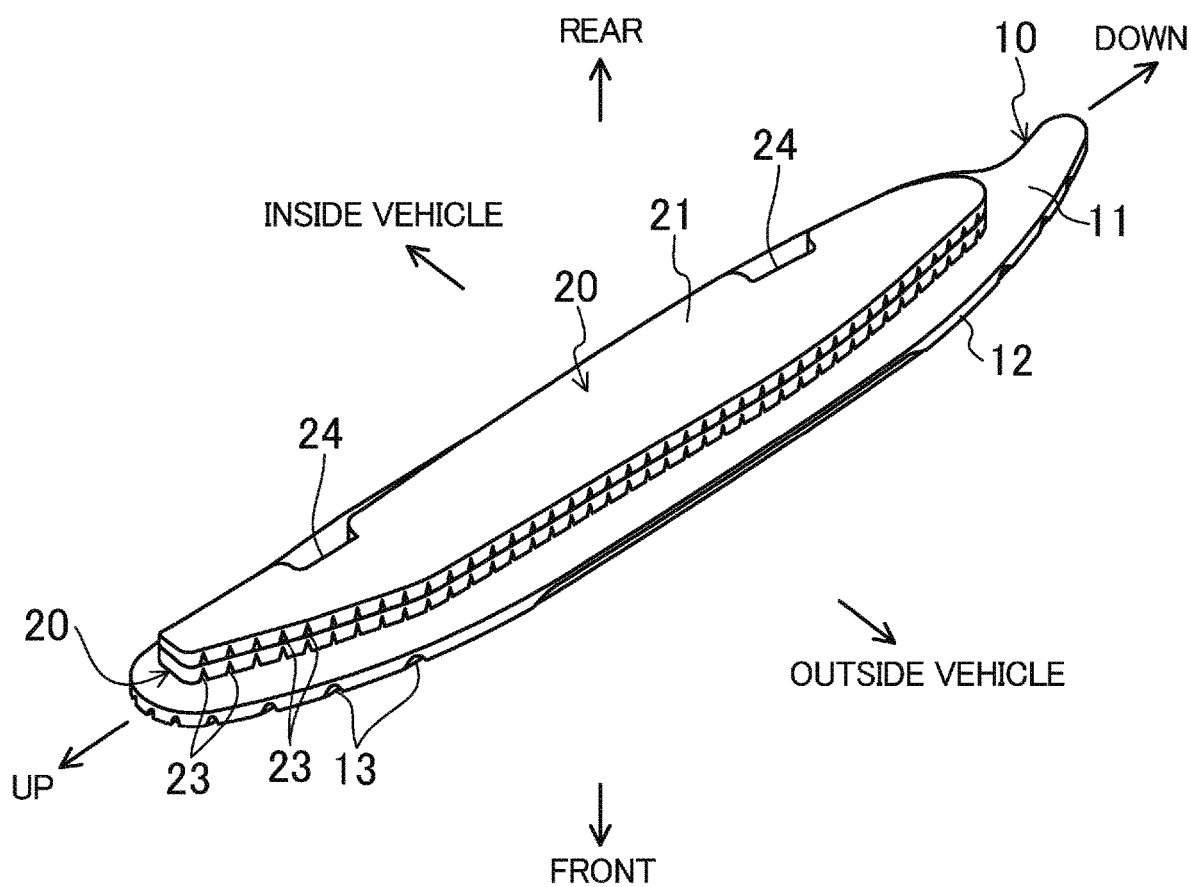
FIG. 8 is a perspective view illustrating that two second acoustic materials are stacked on the first acoustic material.

After that, as shown in FIG. 8, one of the second acoustic materials 20 is stacked on the rear surface 11 of the first acoustic material 10, and the other second acoustic material 20 is stacked on the rear surface 21 of the one of the second acoustic materials 20 to form an acoustic layer with a triple-layer structure. In this case, the first acoustic material 10 and the front second acoustic material 20, and the front and rear second acoustic materials 20 and 20 are not adhered to each other. That is, no adhesive layer is formed between the first acoustic material 10 and the front second acoustic material 20, and between the front and rear second acoustic materials 20 and 20. The adjacent ones of the acoustic materials 10, 20, and 20 are thus not insulated from each other, thereby forming a thick acoustic layer. The first acoustic material 10 and the front second acoustic material 20, and the front and rear second acoustic materials 20 and 20 may be partially adhered to each other for temporary positioning. Although formed partially in this case, adhesive layers are only for temporary positioning and require only a small area for adhesion. This leads to formation of a thick acoustic layer.

The coating member 30 is disposed as shown in FIG. 1. Specifically, the second acoustic materials 20 and 20 enter the recess 31 through the exposed region of the recess 31 of the coating member 30 to allow the fixing plate region 32 to come into contact with the rear surface 11 of the first acoustic material 10. At this time, a manufacturing apparatus including a welder (not shown) may be used. The first acoustic material 10, the second acoustic materials 20 and 20, and the coating member 30 are placed in this order in the manufacturing apparatus. The positioning extensions 32a, 32a, . . . , formed in the fixing plate region 32 of the coating member 30 come into contact with the manufacturing apparatus to bring the coating member 30 into the predetermined position.

In one preferred embodiment, the exposed region of the recess 31 of the coating member 30 faces upward. After the second acoustic materials 20 and 20 are put into the inside of the recess 31, the first acoustic material 10 is placed to cover the recess 31. Then, these are turned upside-down and disposed in the manufacturing apparatus.

After that, the fixing plate region 32 of the coating member 30 is heated and welded from the side opposite to the first acoustic material 10 by the welder so as to be welded to the first acoustic material 10. This heating and welding allows the coating member 30 to integrate the second acoustic materials 20 and 20 with the first acoustic material 10, with the second acoustic materials 20 and 20 covered with the recess 31 of the coating member 30 from the side opposite to the first acoustic material 10. As a result, the soundproofing material 1 is obtained.

Effects and Advantages of Embodiment

The soundproofing material 1 is pushed inside the front fender F. The workability is high at this time, since the first and second acoustic materials 10, 20, and 20 are formed integrally. The workability in transportation of the soundproofing material 1 is also high. When the soundproofing material 1 is pushed inside the front fender F, the first acoustic material 10, the second acoustic materials 20, and the coating member 30 may be elastically deformed.

In this soundproofing material 1 according to the first embodiment, the second acoustic materials 20 and 20 are stacked on the first acoustic material 10 in the thickness direction to form a multilayer structure. The coating member 30 adhered to the first acoustic material 10 integrates the second acoustic materials 20 and 20 with the first acoustic material 10. This configuration reduces displacement between the first acoustic material 10 and the second acoustic materials 20 and 20 without providing any wide adhesive layer between the first acoustic material 10 and the second acoustic materials 20 and 20. This configuration requires no or only a narrow adhesive layer, from which only low acoustic characteristics can be expected. The first acoustic material 10 and the second acoustic materials 20 and 20 form a thick acoustic layer, thereby improving acoustic characteristics.

The first acoustic material 10 is an elastic material having a larger size than the second acoustic materials 20 and 20. The first acoustic material 10 expands beyond the peripheral edges of the second acoustic materials 20 and 20, with the second acoustic materials 20 and 20 stacked on the first acoustic material 10. When the soundproofing material 1 is mounted, the peripheral edge of the first acoustic material 10 may come into contact with another member (the outer plate region F1 or the pillar 100) to be deformed elastically. This reduces formation of a gap between the soundproofing material 1 and the outer plate region F1 or between the soundproofing material 1 and the pillar 100, and displacement of the soundproofing material 1.

If the soundproofing material 1 is, for example, exposed to water, the coating member 30 is disposed to face the water so that the second acoustic materials 20 and 20 are less subjected to the water. This reduces degradation in the acoustic characteristics of the second acoustic materials 20.

Figure 12:
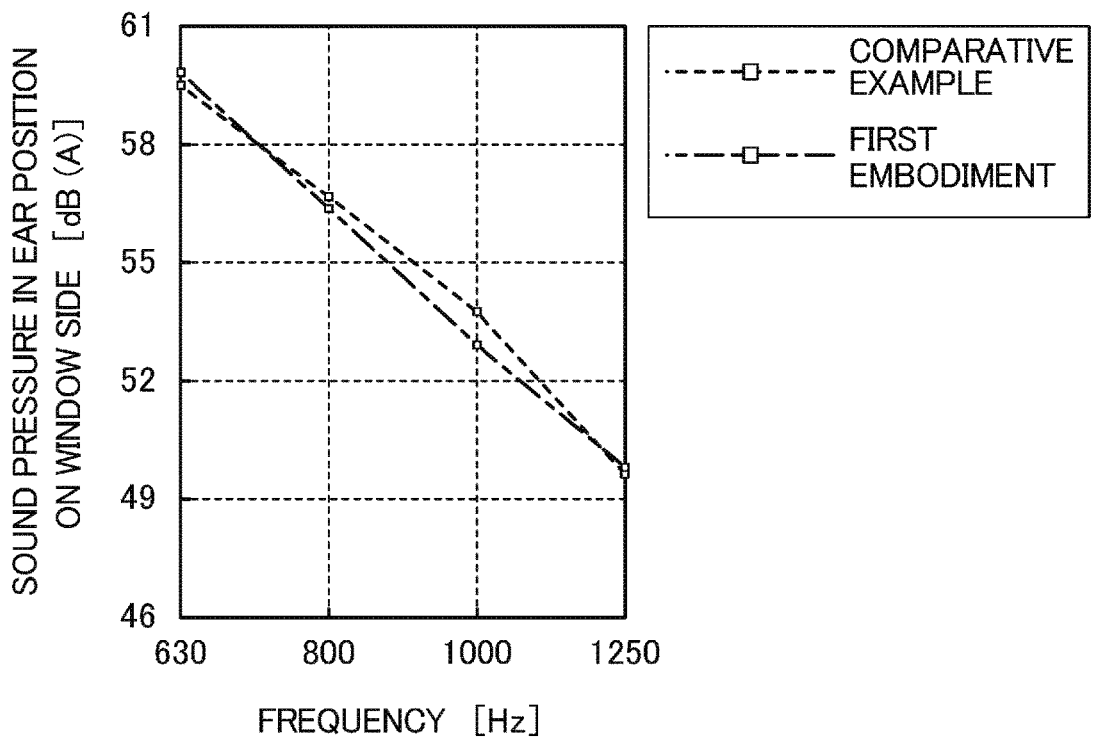
FIG. 12 is a graph showing soundproofing characteristics in a comparative example and the first embodiment.

Now, the difference in the soundproofing performance between the soundproofing material 1 according to the first embodiment and a soundproofing material (not shown) according to a comparative example will be described based on the graph of FIG. 12. FIG. 12 shows a result of an actual driving test. In this test, a standard passenger car was prepared. How large the difference in noise inside the vehicle between the following two cases was tested. In one case, the soundproofing material 1 according to the first embodiment was placed inside the front fender F. In the other case, the soundproofing material according to the comparative example was placed inside the front fender F. As the conditions of the test, the vehicle travels at 100 km per hour on a general paved road. At this time, a microphone is placed in the position corresponding to the ears of a front seat passenger to measure sound pressure. The soundproofing material according to the comparative example is a foamed urethane molded product in a form similar to that of the soundproofing material 1 according to the first embodiment. The foamed urethane molded product of the comparative example has a weight of 130 g. On the other hand, the soundproofing material 1 of the first embodiment has a weight of 118 g.

In the graph of FIG. 12, the horizontal axis represents the frequency (Hz) and the vertical axis represents the sound pressure (dB(A)) in the position corresponding to the ears of the front seat passenger. As can be seen from the graph, the sound pressure at the soundproofing material 1 according to the first embodiment is lower than that at the soundproofing material according to the comparative example by about 1 dB around 1000 Hz. It is thus found that the soundproofing material 1 according to the first embodiment has higher soundproofing characteristics.

Second Embodiment

Figure 9:
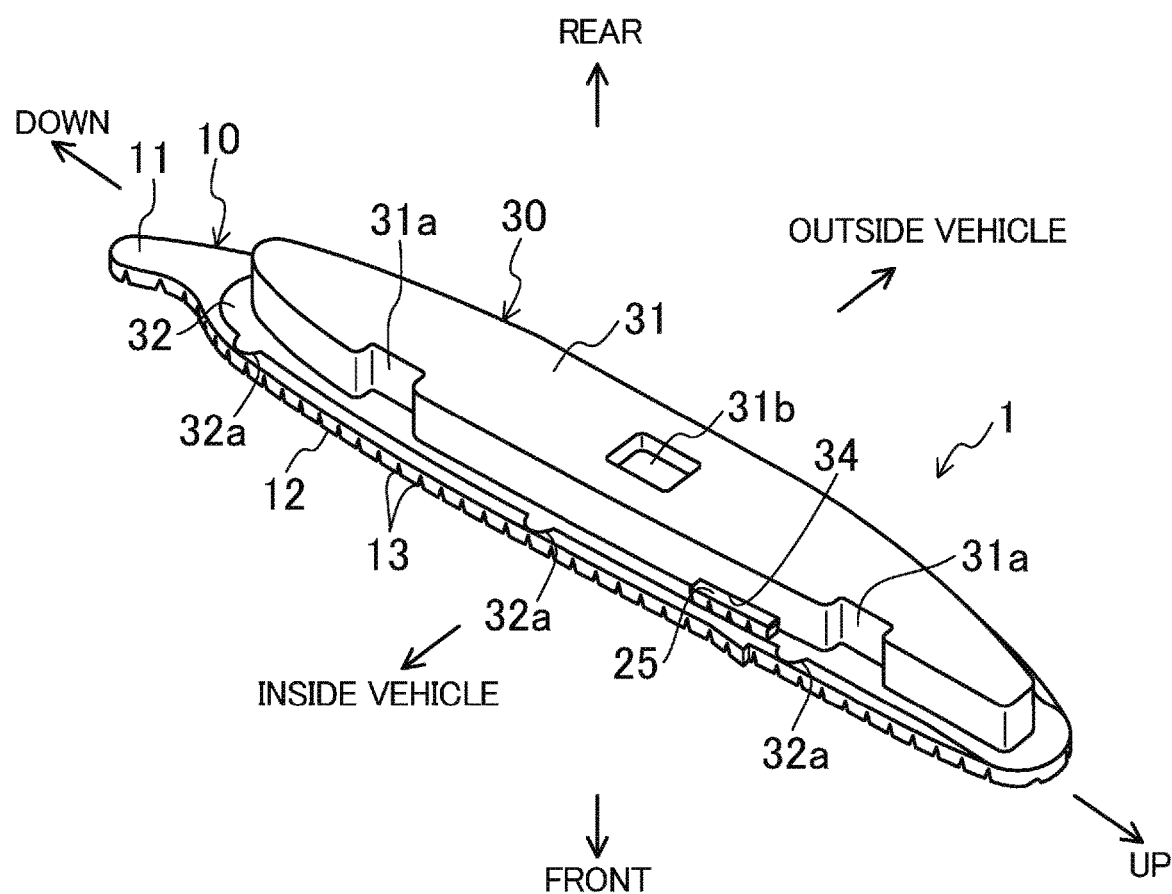
FIG. 9 is a perspective view of a soundproofing material according to a second embodiment.
Figure 10:
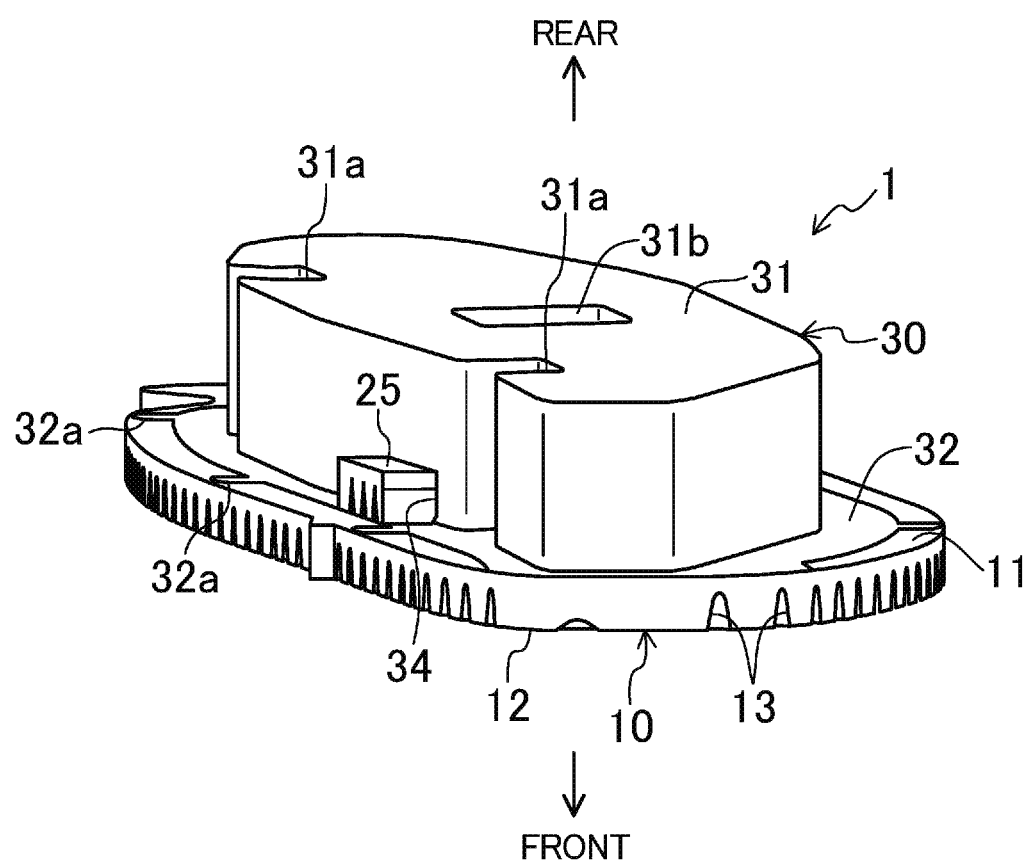
FIG. 10 is a perspective view of the soundproofing material according to the second embodiment as viewed from an angle different from that of FIG. 9.
Figure 11:
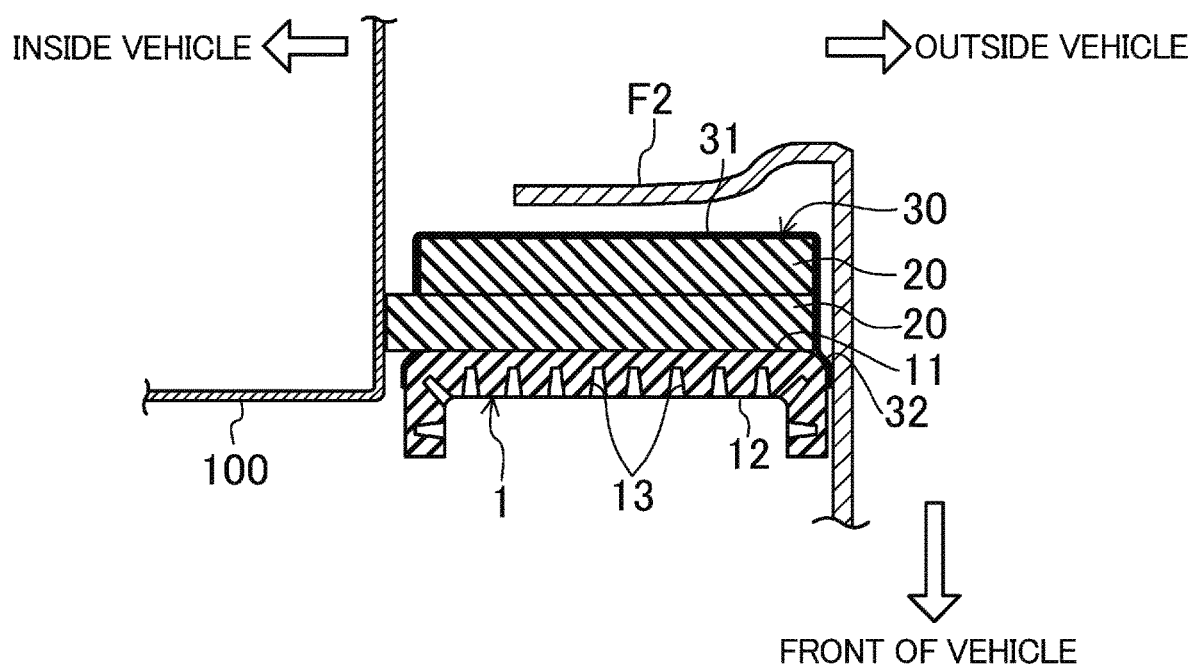
FIG. 11 illustrates the second embodiment and corresponds to FIG. 4.

FIGS. 9 and 10 illustrate a soundproofing material 1 according to a second embodiment of the present disclosure. This second embodiment differs from the first embodiment in that the peripheral edges of the second acoustic materials 20 partially project outside the coating member 30. In the other respects, the second embodiment is the same as the first embodiment. The same reference characters as those shown in the first embodiment are used to represent equivalent elements, and the explanation thereof will be omitted. Only the differences from the first embodiment will be described.

Figure 3:
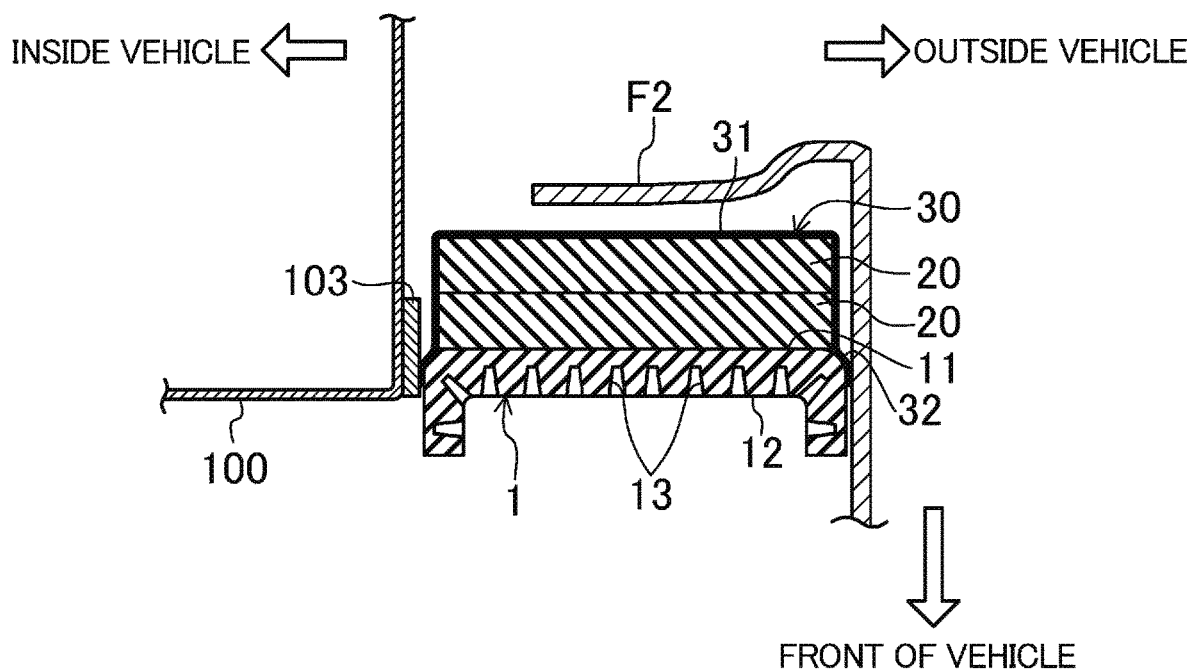
FIG. 3 is a cross-sectional view of the soundproofing material mounted in the vehicle body taken along the line of FIG. 1.
Figure 4:
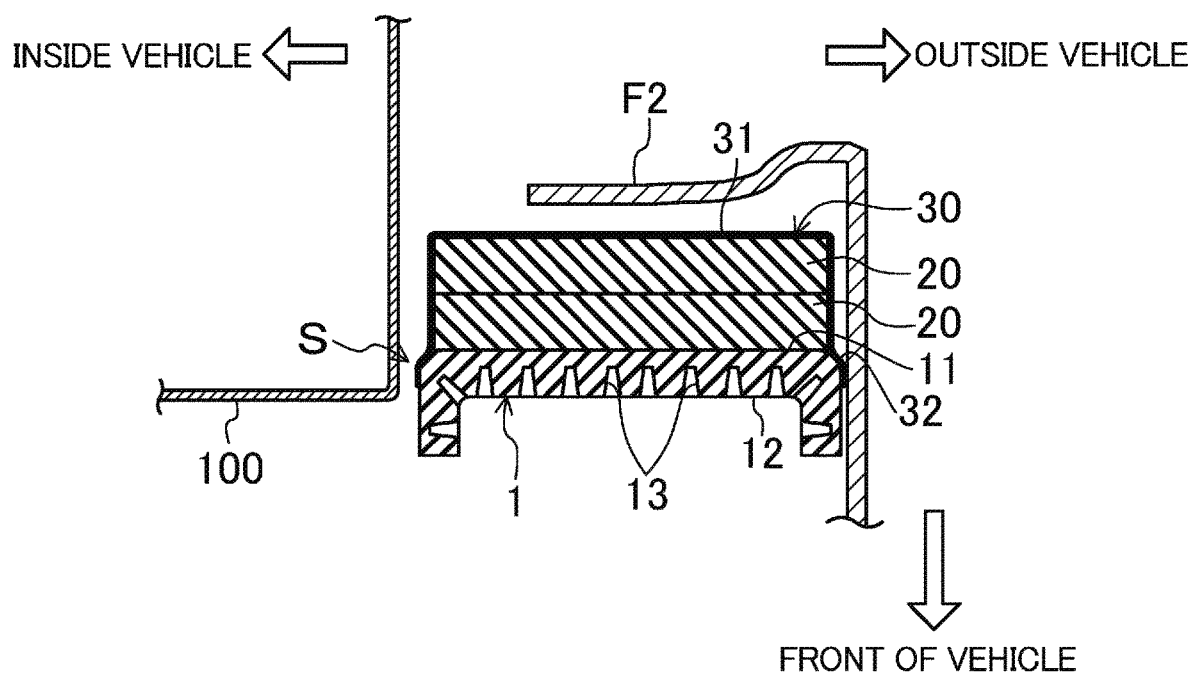
FIG. 4 is a cross-sectional view of the soundproofing material mounted in the vehicle body taken along the line IV-IV of FIG. 1.

In the first embodiment, as shown in FIG. 3 taken along the line of FIG. 1, the soundproofing material 1 is attached to and abuts on a reinforcing material 103 stacked on the pillar 100. However, in FIG. 4 taken along the line IV-IV of FIG. 1, a gap S is partially formed between the soundproofing material 1 and the pillar 100, since the reinforcing material is formed discontinuously. In this second embodiment, the peripheral edges of the second acoustic materials 20 partially project in the position corresponding to the gap S in the first embodiment to allow the projection to come into contact with the pillar 100 and to hardly form a gap.

Specifically, as shown in FIGS. 9 and 10, a projection 25 projecting inward in the vehicle is molded integrally with the second acoustic material 20 directly stacked on the first acoustic material 10 in a portion of the top of the peripheral edge of the second acoustic material 20 on the side closer to the inside of the vehicle. This projection 25 passes through the inside of a cutout 34 formed in the recess 31 of the coating member 30 and reaches the outside of the recess 31. In this second embodiment, the projection 25 is provided in the portion of the top of the peripheral edge of the second acoustic material 20 on the side closer to the vehicle. The location of the projection 25 is not limited thereto. The projection 25 may be located, for example, on the bottom of the peripheral edge of the second acoustic material 20 and/or on the outer side of the vehicle. A plurality of projections 25 may be provided.

Like the first embodiment, the second embodiment reduces displacement between the first acoustic material 10 and one of the second acoustic materials 20 and between the second acoustic materials 20 and 20 without providing any wide adhesive layer between the first acoustic material 10 and the one of the second acoustic materials 20 and between the second acoustic materials 20 and 20. This configuration requires no or only a narrow adhesive layer, from which only low acoustic characteristics can be expected. The first acoustic material 10 and the second acoustic materials 20 and 20 form a thick acoustic layer, thereby improving acoustic characteristics.

Figure 13:
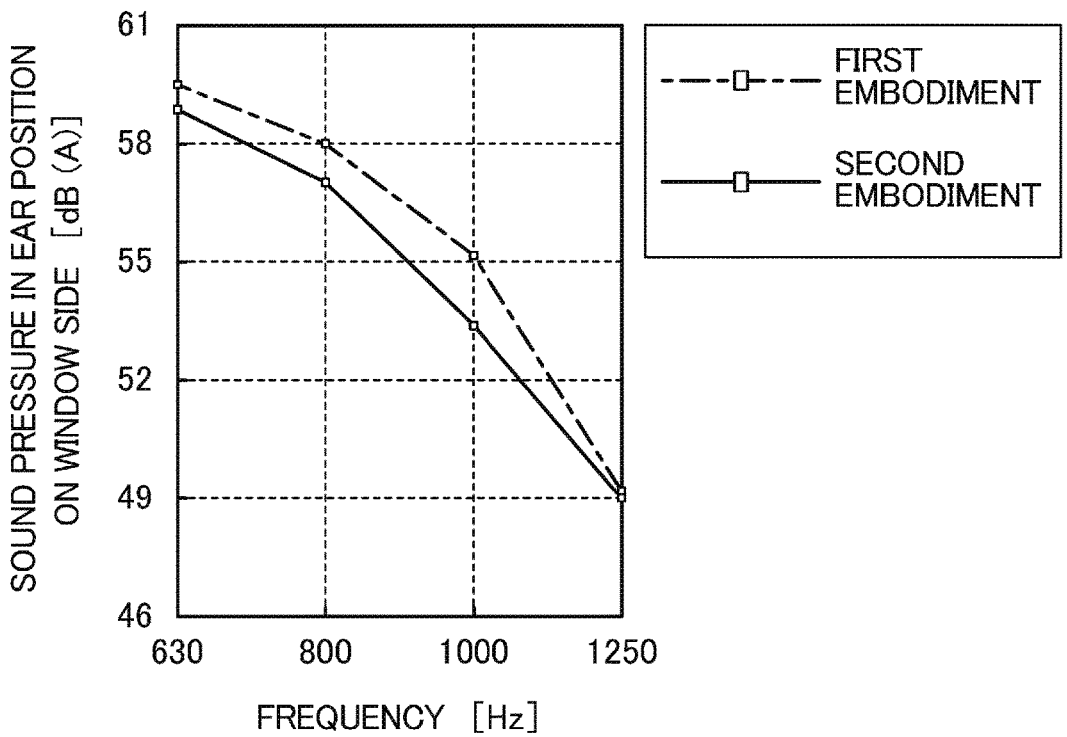
FIG. 13 is a graph showing soundproofing characteristics in the first and second embodiments.

The soundproofing performance of the soundproofing material 1 according to the second embodiment will be described based on the graph of FIG. 13. The sound pressure at the soundproofing material 1 according to the second embodiment is lower than that at the soundproofing material 1 according to the first embodiment by about 1 dB around 800 Hz, and by about 1.7 dB at maximum in a frequency range of 1000 Hz or more. It is thus found that the soundproofing material 1 according to the second embodiment has further higher soundproofing characteristics. The sound pressures at 800 Hz and 1000 Hz in the first embodiment are slightly different between FIG. 12 and FIG. 13. This is because the actual driving tests were conducted on different days and road conditions were not completely the same.

In the second embodiment, the projection 25 blocking the gap is molded integrally with the second acoustic materials 20. The configuration is not limited thereto. An elastic body separate from the second acoustic materials 20 may be provided outside the coating member 30 to block the gap. This configuration requires no cutout 34 in the coating member 30, thereby improving waterproof characteristics.

In one preferred embodiment, the first acoustic material 10, the second acoustic materials 20, and the coating member 30 are colored in black. This makes the soundproofing material 1 inconspicuous in a dark place like the inside of the front fender F.

In the first and second embodiments, the case where the soundproofing material 1 according to the present disclosure is placed inside the front fender F has been described. The location of the soundproofing material 1 is not limited thereto. The soundproofing material 1 may be placed inside a rear fender, an engine compartment, and any other component inside the vehicle. In the first and second embodiments, the case where the soundproofing material 1 according to the present disclosure is the soundproofing material for a vehicle has been described. The application of the soundproofing material 1 is not limited thereto. The soundproofing material 1 may be used as a soundproofing material for, for example, a house or an electrical appliance.

The embodiments described above are mere examples in every respect, and shall not be interpreted in a limited manner. Furthermore, any modification and change equivalent to the scope of claims fall within the scope of the present disclosure.

As described above, the soundproofing material according to the present disclosure is useful as a soundproofing material for, for example, a vehicle or an electrical appliance.

The invention claimed is:

1. A soundproofing material including integrally formed acoustic materials, the soundproofing material comprising:
   a first sheet-like acoustic material;
   a second sheet-like acoustic material stacked on the first acoustic material in a thickness direction; and
   a coating member covering the second acoustic material from a side opposite to the first acoustic material, and adhered to the first acoustic material, wherein
   the coating member integrates the second acoustic material with the first acoustic material, and
   the first acoustic material is an elastic material with a larger outer size than the second acoustic material, and expands beyond a peripheral edge of the second acoustic material, with the second acoustic material stacked on the first acoustic material, the peripheral edge of the first acoustic material is deformable by coming into contact with a member positioned around the soundproofing material, and
   a plurality of grooves are formed on a surface of the first acoustic material on the opposite side from the second acoustic material such that the plurality of grooves are spaced apart from each other.

2. The soundproofing material of claim 1, wherein the coating member includes
   a recess housing the second acoustic material, and
   a fixing plate region formed in a peripheral edge of the recess, and adhered to a peripheral edge of the first acoustic material.

3. The soundproofing material of claim 2, wherein the peripheral edge of the second acoustic material partially projects outside the coating member.

4. The soundproofing material of claim 1, wherein the coating member is a water impermeable member.

* * * * *